United States Patent
Katoh

(10) Patent No.: US 10,246,030 B2
(45) Date of Patent: Apr. 2, 2019

(54) OBJECT DETECTION APPARATUS AND DRIVING ASSISTANCE APPARATUS

(71) Applicant: TOYOTA JIDOSHA KABUSHIKI KAISHA, Toyota-shi, Aichi-ken (JP)

(72) Inventor: Masayuki Katoh, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 473 days.

(21) Appl. No.: 14/418,590

(22) PCT Filed: Dec. 14, 2012

(86) PCT No.: PCT/JP2012/082531
§ 371 (c)(1),
(2) Date: Jan. 30, 2015

(87) PCT Pub. No.: WO2014/024336
PCT Pub. Date: Feb. 13, 2014

(65) Prior Publication Data
US 2015/0298621 A1    Oct. 22, 2015

(30) Foreign Application Priority Data
Aug. 9, 2012  (JP) .................................. 2012-177254

(51) Int. Cl.
*G06K 9/00* (2006.01)
*G08G 1/16* (2006.01)
*B60R 11/04* (2006.01)

(52) U.S. Cl.
CPC .......... *B60R 11/04* (2013.01); *G06K 9/00805* (2013.01); *G08G 1/16* (2013.01);
(Continued)

(58) Field of Classification Search
None
See application file for complete search history.

(56) References Cited

U.S. PATENT DOCUMENTS 6,487,303 B1 * 11/2002 Yamaguchi ............... G06T 7/74
382/103
6,813,370 B1 * 11/2004 Arai .......................... G01S 11/12
340/908.1
(Continued)

FOREIGN PATENT DOCUMENTS

| DE | 102006049246 A1 | 4/2008 |
| DE | 102010012954 A1 | 9/2011 |

(Continued)

*Primary Examiner* — William C Vaughn, Jr.
*Assistant Examiner* — Lindsay J Uhl
(74) *Attorney, Agent, or Firm* — Sughrue Mion, PLLC

(57) ABSTRACT

An object of the present invention is to provide an object detection apparatus and a driving assistance apparatus in which movement information of a target object can be obtained with high accuracy. In the present invention, the object detection apparatus is an apparatus that detects a target object from a predetermined mounting position (a vehicle and the like); performs an object detection from a predetermined mounting position; in a case where a target object is detected, acquires the position of the target object; obtains a feature amount of a fixed object existing around the target object and detects a position of a fixed object; sets the position of the fixed object as a reference point; and calculates movement information of the target object from the position of the target object with the reference point as a reference.

3 Claims, 9 Drawing Sheets

(52) U.S. Cl.
CPC ............. *G08G 1/165* (2013.01); *G08G 1/166* (2013.01); *B60R 2300/10* (2013.01)

(56) References Cited

U.S. PATENT DOCUMENTS

| | | | |
|---|---|---|---|
| 7,446,798 B2 * | 11/2008 | Comaniciu | G06K 9/3241 348/143 |
| 2003/0210807 A1 * | 11/2003 | Sato | G06K 9/00805 382/104 |
| 2007/0071311 A1 * | 3/2007 | Rovira-Mas | G06T 7/70 382/154 |
| 2008/0151054 A1 * | 6/2008 | Kubota | B60R 1/00 348/148 |
| 2009/0189783 A1 * | 7/2009 | Koitabashi | G01S 11/12 340/937 |
| 2010/0104199 A1 * | 4/2010 | Zhang | G06K 9/00798 382/199 |
| 2011/0234422 A1 | 9/2011 | Yamashita | |

FOREIGN PATENT DOCUMENTS

| | | | |
|---|---|---|---|
| EP | 2287060 A1 | 2/2011 | |
| JP | 9-73529 A | 3/1997 | |
| JP | 10-105891 A | 4/1998 | |
| JP | 1144551 A * | 2/1999 | ............. G01C 21/20 |
| JP | 11044551 A * | 2/1999 | |
| JP | 2000-247207 A | 9/2000 | |
| JP | 2004-139338 A | 5/2004 | |
| JP | 2008-146185 A | 6/2008 | |
| JP | 2008-293095 A | 12/2008 | |
| JP | 2011-154480 A | 8/2011 | |
| JP | 2011-198295 A | 10/2011 | |

\* cited by examiner

OBJECT DETECTION APPARATUS AND DRIVING ASSISTANCE APPARATUS

CROSS REFERENCE TO RELATED APPLICATIONS

This application is a National Stage of International Application No. PCT/JP2012/082531 filed Dec. 14, 2012, claiming priority based on Japanese Patent Application No. 2012-177254, filed Aug. 9, 2012, the contents of all of which are incorporated herein by reference in their entirety.

TECHNICAL FIELD

The present invention relates to an object detection apparatus that detects a target object from a host vehicle and a driving assistance apparatus that performs a collision avoidance assist between the host vehicle and the target object based on the detection result of the object detection apparatus.

BACKGROUND ART

It is necessary to detect a target object (for example, a pedestrian or another vehicle) from a traveling host vehicle with high accuracy for use in determining a collision or the like between the host vehicle and the target object. In such a detection of the object, it is important to determine whether the object is a moving object such as a pedestrian or a static object such as a telephone pole. For such a determination, movement information (for example, a movement speed, a movement vector, or a movement amount) of an object detected by a radar sensor or an image sensor is used. In an apparatus disclosed in Patent Literature 1, a lateral movement speed of an object existing in front of a traveling route of a host vehicle is acquired, and the lateral movement speed is compared to a threshold value, and then, it is determined whether or not there is a possibility of the object entering the traveling route of the host vehicle. In an apparatus disclosed in Patent Literature 2, an object on the traveling route of the host vehicle is detected by a radar, and a speed obtained by subtracting the movement speed of the host vehicle from the apparent movement speed of the object detected by the radar is set as the movement speed of the object, and then, it is determined whether the object is a moving object or not by comparing the movement speed to the threshold value. In addition, in an apparatus disclosed in Patent Literature 3, it is determined whether the object is a moving object or not by comparing a reference trajectory of the static object and a trajectory of the object detected from the image with a static object of which a feature amount in the image is prominent as a reference.

CITATION LIST

Patent Literature

[Patent Literature 1] Japanese Unexamined Patent Application Publication No. 10-105891
[Patent Literature 2] Japanese Unexamined Patent Application Publication No. 2000-247207
[Patent Literature 3] Japanese Unexamined Patent Application Publication No. 2008-146185

SUMMARY OF INVENTION

Technical Problem

When a detected object exists at a position comparatively far from a host vehicle and the host vehicle minutely deflects, such a minute deflection component is added to a movement amount of a target object, and thus, there is a case where a static object is erroneously detected as a moving object or a moving object is erroneously detected as a static object. For example, in a case where an object exists at a position 30 meters ahead, a movement amount 20 cm of the object in a lateral direction corresponds to a deflection of the vehicle at approximately 0.4 degrees. However, since a yaw rate sensor mass-produced as an in-vehicle mounting device cannot detect such a minute deflection, it is difficult to correctly offset the minute deflection component. As the distance to the object increases, the apparent movement amount of the object with respect to the deflection component of the host vehicle increases. Therefore, the movement amount of the object cannot be obtained with high accuracy. As a result, it is not possible to determine with high accuracy whether the target object is a moving object or a static object. In a case of an apparatus disclosed in Patent Literature 1, as the detected object is separated farther from the host vehicle, the lateral movement speed is acquired including an error caused by the minute deflection of the host vehicle, and thus, the lateral movement speed cannot be obtained with high accuracy. In addition, in a case of an apparatus disclosed in Patent Literature 2, as the detected object is separated farther from the host vehicle, an error caused by the minute deflection of the host vehicle is included in the apparent movement speed of the detected object, and thus, the accuracy of the movement speed of the object decreases. In addition, in a case of an apparatus disclosed in Patent Literature 3, since an object of which a feature amount in the image is prominent is detected as a static object, for example, in a case where an object having a certain size (a vehicle or the like) moving at a very low speed around the host vehicle exists, there is a possibility of erroneously detecting the object as a static object and the object moving at very low speed becomes a reference. Therefore, the accuracy of determining whether or not the object is a moving object decreases.

Therefore, the object of the present invention is to provide an object detection apparatus and a driving assistance apparatus in which the movement information of a target object can be obtained with high accuracy.

Solution to Problem

An object detection apparatus according to the present invention is an object detection apparatus that detects a target object from a predetermined mounting position. The apparatus includes: an object detection unit that performs an object detection from the predetermined mounting position, and in a case where a target object is detected, acquires the position of the target object; a feature amount acquisition unit, in a case where the target object is detected by the object detection unit, that acquires a feature amount on the road surface around the position of the target object detected by the object detection unit from the predetermined mounting position; a reference point setting unit that sets the reference point on the road surface based on the feature amount on the road surface acquired by the feature amount acquisition unit; and a movement information calculation unit that, in a case where the target object is detected by the object detection unit, calculates movement information of the target object from the position of the target object acquired by the object detection unit with the reference point set by the reference point setting unit as a reference.

In the object detection apparatus, the object detection is performed by the object detection unit from the predetermined mounting position, and in a case where the target object can be detected, the position of the target object (a relative position with respect to the predetermined mounting position) is acquired. A vehicle, a moving object other than a vehicle, a structure, and a road are examples of the predetermined mounting position. In a case where the target object is detected by the object detection unit, in the object detection apparatus, the feature amount acquisition unit acquires the feature amount on the road surface around the position of the target object. Then, in the object detection apparatus, the reference point setting unit sets the reference point on the road surface based on the feature amount on the road surface. The reference point is a point which is always fixed (does not move). Therefore, there is no case where an object moving at very low speed is erroneously recognized as a fixed object and is set as the reference point. In the object detection apparatus, the movement information calculation unit calculates the movement information (for example, the movement vector, the movement amount or the movement speed) of the target object from the position of the target object with the reference point as a reference. The movement information of the target object is the information not with the predetermined mounting position as the reference but with the point which is always fixed as the reference. Therefore, the movement information is not affected by the movement of the predetermined mounting position on the vehicle or the like, and is not affected by a deflection even if the predetermined mounting position is deflected. In this way, in the object detection apparatus, by setting the reference point on the road surface based on the feature amount on the road surface and calculating the movement information of the target object, it is possible to obtain the movement information of the target object with high accuracy. Using the highly accurate movement information of the target object, it is possible to determine whether the object is a moving object or a static object with high accuracy.

In the object detection apparatus according to the present invention, in a case where the target object is detected by the object detection unit, it is preferable that the movement information calculation unit calculate the movement information calculation unit calculates the movement information of the target object from changes in position of a target object acquired at different points in time by the object detection unit with the reference point set by the reference point setting unit as the reference. In this way, the movement information of the target object can be calculated from changes in position of the target object acquired at different points in time with the reference point (the position of the fixed object) as the reference, and the movement information is not affected by the movement of the predetermined mounting position.

In the object detection apparatus according to the present invention, it is preferable that the fixed object detection unit include a feature amount acquisition unit that acquires a feature amount of the fixed object existing on the road or the roadside around the position of the target object detected by the object detection unit, from the predetermined mounting position, and the reference point setting unit set a reference point based on the feature amount acquired by the feature amount acquisition unit.

The fixed object detection unit acquires, in order to detect the fixed object, a specific feature amount of the fixed object existing on the road or the roadside around the position of the target object detected by the object detection unit. Then, the reference point setting unit sets a reference point based on the feature amount. In this way, in the object detection apparatus, by acquiring the feature amount of the fixed object, it is possible to simply detect the fixed object existing on the road or the roadside with high accuracy, and the reference point can be set.

In the object detection apparatus according the present invention, the feature amount acquisition unit may acquire the feature amount on the road surface around the position of the target object acquired by the object detection unit, and the reference point setting unit may set a reference point on the road surface based on the feature amount on the road surface acquired by the feature amount acquisition unit.

The feature amount acquisition unit acquires the feature amount on the road surface around the position of the target object For example, the brightness gradient on the road is an example of the feature amount. Then, the reference point setting unit sets a reference point on the road surface based on the feature amount. The reference point is a point on the surface of the road, and is always fixed on the road. In this way, in the object detection apparatus, by setting a reference point on the road surface as the reference point based on the feature amount on the road surface, it is possible to set the point always fixed on the road as the reference point.

In the object detection apparatus according to the present invention, at the position around the target object detected by the object detection unit, the feature amount acquisition unit may acquire pattern information that matches pattern information of a fixed object installed on the road or the roadside, and the reference point setting unit may set the position of the fixed object having the pattern acquired by the feature amount acquisition unit as a reference point.

At the position around the target object, the feature amount acquisition unit performs a pattern matching using the pattern information of the fixed object installed on the road or the roadside, and acquires the pattern that matches the pattern information. The fixed object installed on the road or the roadside is the fixed object having the recognizable pattern information on the road or the roadside, and a traffic sign and a traffic signal are examples thereof. The pattern information of a number, a symbol, a character, a picture written on the traffic sign, and pattern information of an external shape of the traffic sign are examples of the pattern information of the fixed object. Then, the reference point setting unit sets the position of the fixed object having the acquired pattern as a reference point. This reference point is the position of the fixed object installed on the road or the roadside and is the always fixed point. In this way, in the object detection apparatus, by setting the position of the fixed object installed on the road or the roadside as a reference point based on the pattern information of the fixed object installed on the road or the roadside, it is possible to set the point which is always fixed on the road or the roadside as the reference point.

In the object detection apparatus according to the present invention, at the position around the target object detected by the object detection unit, the feature amount acquisition unit may acquire a dimension of the fixed object that is within a dimension threshold value range which is set from dimension information of the fixed object installed on the road or the roadside, and the reference point setting unit may set the position of the fixed object having the dimension acquired by the feature amount acquisition unit as a reference point.

At the position around the target object, the feature amount acquisition unit performs a dimension determination based on a dimension threshold value range which is set from dimension information of the fixed object installed on the road or the roadside and obtains the dimension of the object that is within the dimension threshold value range. The fixed object installed on the road or the roadside is the fixed object having dimension information apparently different from that of the pedestrian or the vehicle, and an electric pole and a post are the examples thereof. Then, the reference point setting unit sets the position of the fixed object having the acquired dimension as a reference point. This reference point is a position of the fixed object installed on the road or the roadside and is a point which is always fixed. In this way, in the object detection apparatus, by setting the position of the fixed object installed on the road or the roadside as the reference point based on the dimension information of the fixed object installed on the road or the roadside, it is possible to set the point always fixed on the road or the roadside as the reference point.

In the object detection apparatus according to the present invention, the movement information calculation unit calculates movement information of the target object based on relative information between the reference point set by the reference point setting unit and the position of the target object acquired at a previous time by the object detection unit and relative information between the reference point set by the reference point setting unit and the position of the target object acquired at this time by the object detection unit.

The movement information calculation unit calculates the relative information (for example, a relative vector or a relative position with respect to the reference point) between the reference point and the position of the target object of the previous time, and calculates the relative information between the reference point and the position of the target object of this time. Since the relative information is not the relative information with the predetermined mounting position as the reference but the relative information with the position of the fixed object as the reference, the moved portion of the predetermined mounting position is not included. Then the movement information calculation unit calculates movement information of the position of the target object from the previous time to this time based on the two relative information items. In this way, the movement information of the target object can be calculated from each position of the target object with the reference point as the reference, and thus, the movement information is not affected by the movement of the predetermined mounting position.

In the object detection apparatus according to the present invention, it is preferable that the reference point setting unit sets a reference point from the position surrounding a lateral direction from adding 0 to 1 times a movement amount in the lateral direction of the target object detected by the object detection unit to the lateral movement direction side, from the position in the lateral direction of the target object acquired by the object detection unit.

If the target object detected by the object detection unit is assumed to continue the same movement, a movement amount of the target object in the lateral direction of the next time can be predicted using the detected information. Therefore, the reference point setting unit sets the reference point of the next time around the lateral position where equal to or more than 0 time and equal to or less than one time (0 to 1 times) a movement amount in the lateral direction of the target object is added to the lateral movement direction side from the position in the lateral direction of the target object using the predicted movement amount in the lateral direction. Since equal to or more than 0 time and equal to or less than one time an amount of lateral movement of the target object is added, the set reference point is positioned between the lateral position of this time and the predicted lateral position of the next time of the target object. In this way, by determining the reference point (particularly, the lateral position) of the next time in advance, the processing area for setting the reference point can be squeezed, and thus, it is possible to reduce the processing load or the amount of memory.

In the object detection apparatus according to the present invention, it is preferable that the reference point setting unit sets a reference point from the position surrounding a distance direction from adding 1 to 2 times a movement amount in the distance direction of the target object detected by the object detection unit to the predetermined mounting position in the distance direction side, from the position in the distance direction of the target object acquired by the object detection unit.

If the target object detected by the object detection unit is assumed to continue the same movement, a movement amount of the target object in the distance direction (a depth direction) of the next time can be predicted using the detected information. Therefore, the reference point setting unit sets reference point around the distance position of the next time where equal to or more than one time and equal to or less than two times (1 to 2 times) the movement amount in the distance direction of the target object is added to the predetermined mounting position side (front side) from the position of the target object in the distance direction using the predicted movement amount in the distance direction. Since equal to or more than one time and equal to or less than two times the amount of distance movement of the target object is added from the distance position of this time, the set reference point positions at the predetermined mounting position side from the predicted distance position of the next time of the target object. In this way, by determining the reference point (particularly, the distance position) of the next time in advance, the processing area for setting the reference point can be squeezed, and thus, it is possible to reduce the processing load or the amount of memory. Furthermore, even in a case where the target object is moved to the predetermined mounting position, the reference point positions at the predetermined mounting position side (front side) from the predicted distance position of the next time of the target object. Therefore, the reference point is not hidden behind the target object.

It is preferable that the object detection apparatus according to the present invention further include a movement information acquisition unit that acquires movement information of the predetermined mounting position, and the reference point setting unit set a new reference point around the position to which the set reference point is moved based on the movement information acquired by the movement information acquisition unit.

The position (apparent position) of the target object obtained by the object detection unit is a position where the moved portion of the predetermined mounting position is added to the moved portion of the target object. In a case where the reference point is set using the movement information of the target object calculated by the movement information calculation unit, since the movement information of the predetermined mounting position is not included in the movement information of the target object calculated by the movement information calculation unit, the moved portion of the predetermined mounting position is not added to the set reference point. For this reason, in a case where the relative information between the position of the target object newly detected by the object detection unit and the reference point is calculated, it is needed that the reference point also is moved in advance with adding the movement information of the predetermined mounting position. Therefore, the reference point setting unit sets a new reference point around the position to which the set reference point is moved based on the movement information of the predetermined mounting position. The new reference point is set around the position to which the set reference point is moved by the movement information of the predetermined mounting position. Therefore, the processing area for setting the reference point can be squeezed, and thus, it is possible to reduce the processing load or the amount of memory.

The object detection apparatus according to the present invention further includes a determination unit that determines whether the target object detected by the object detection unit is a moving object or a static object based on the movement information calculated by the movement information calculation unit. In the object detection apparatus, by using the movement information calculated with high accuracy at the time of determination, it is possible to determine whether the target object is the moving object or the static object with high accuracy.

A driving assistance apparatus according to the present invention is a driving assistance apparatus that performs an assist for avoiding a collision between a host vehicle and the target object. Any one of above-described object detection apparatuses is mounted on the driving assistance apparatus, and the collision avoidance assist is performed based on the detection result of the object detection apparatus.

In the object detection apparatus described above, the highly accurate movement information of the target object can be obtained, and by using the highly accurate movement information, it is possible to determine whether the target object is the moving object or the static object with high accuracy. Therefore, in the driving assistance apparatus, using the detection result (the highly accurate movement information of the target object, the highly accurate determination result whether the target object is the moving object or the static object, or the like) of the object detection apparatus, the collision avoidance assist between the host vehicle and the target object can be performed with high accuracy.

Advantageous Effects of Invention

According to the present invention, by setting a position of a fixed point as a reference point and calculating movement information of a target object, it is possible to obtain the movement information of the target object with high accuracy.

BRIEF DESCRIPTION OF DRAWINGS

FIG. 9A illustrates a case where a traffic sign is set as the reference point and FIG. 9B illustrates a case where an electric pole is set as the reference point.

DESCRIPTION OF EMBODIMENTS

Hereinafter, an embodiment of an object detection apparatus and a driving assistance apparatus in the present invention will be described with reference to the drawings. Here, the same or equivalent elements are referred to by the same reference signs in describing the drawings, and the description thereof will not be repeated.

In the present embodiment, the object detection apparatus and the driving assistance apparatus in the present invention are applied to a collision prediction apparatus mounted on a vehicle. The collision prediction apparatus in the present embodiment detects a target object by a stereo camera, performs a collision determination between the target object and the host vehicle, and in a case where there is a possibility of collision, performs an assistance for avoiding the collision or reducing the damage of the collision. Particularly, the collision prediction apparatus in the present embodiment calculates a movement amount of the target object, determines whether the target object is a moving object or a static object based on the movement amount of the target object, and then, sets a threshold value for determining the collision depending on whether the target object is the moving object or the static object. Here, the target object includes the moving object and the static object. For example, the moving object includes a pedestrian, a bicycle, and a vehicle. The static object includes an electric pole and the traffic sign.

Figure 1:
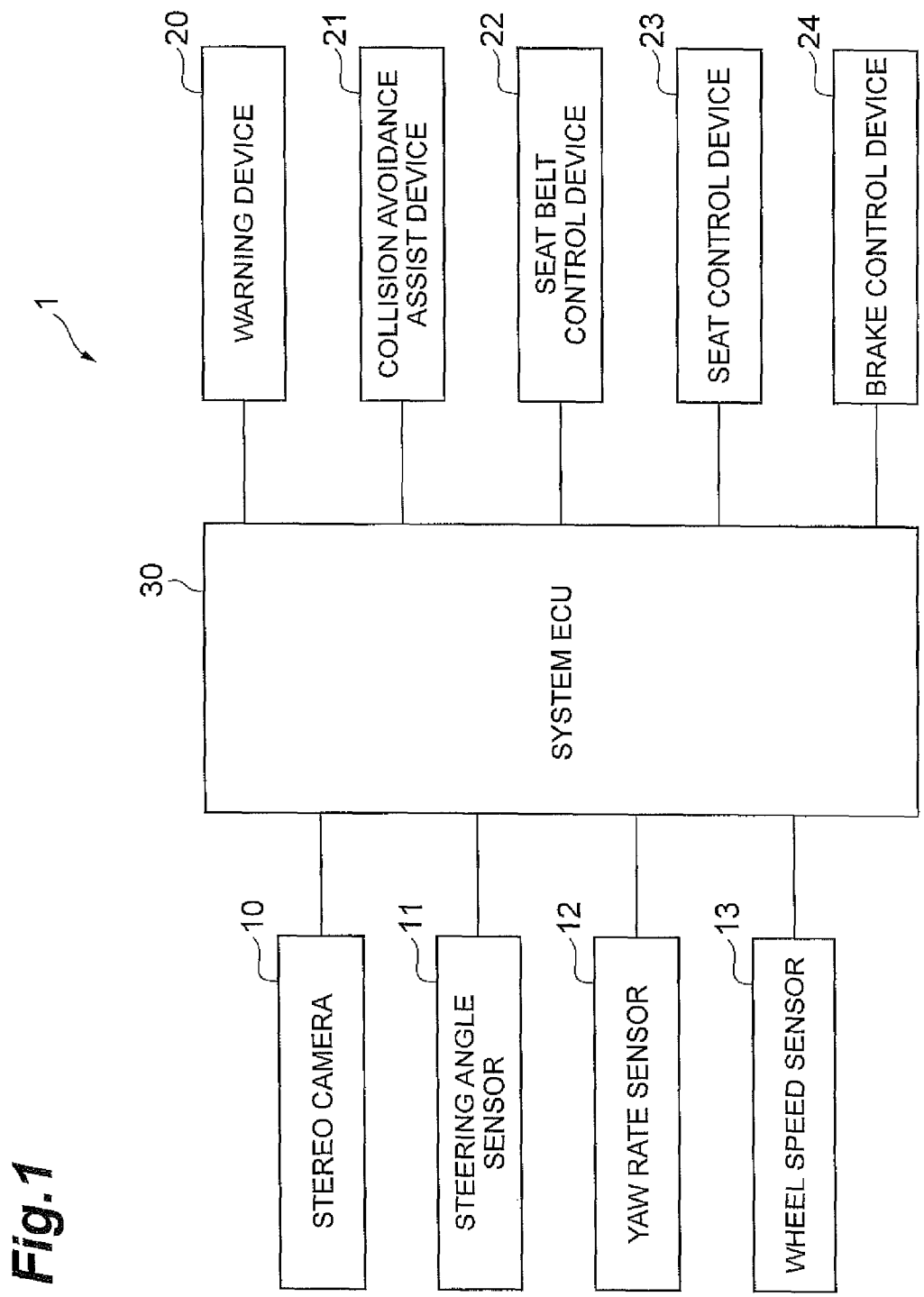
FIG. 1 is a configuration diagram of a collision prediction apparatus in an embodiment of the present invention.
Figure 2:
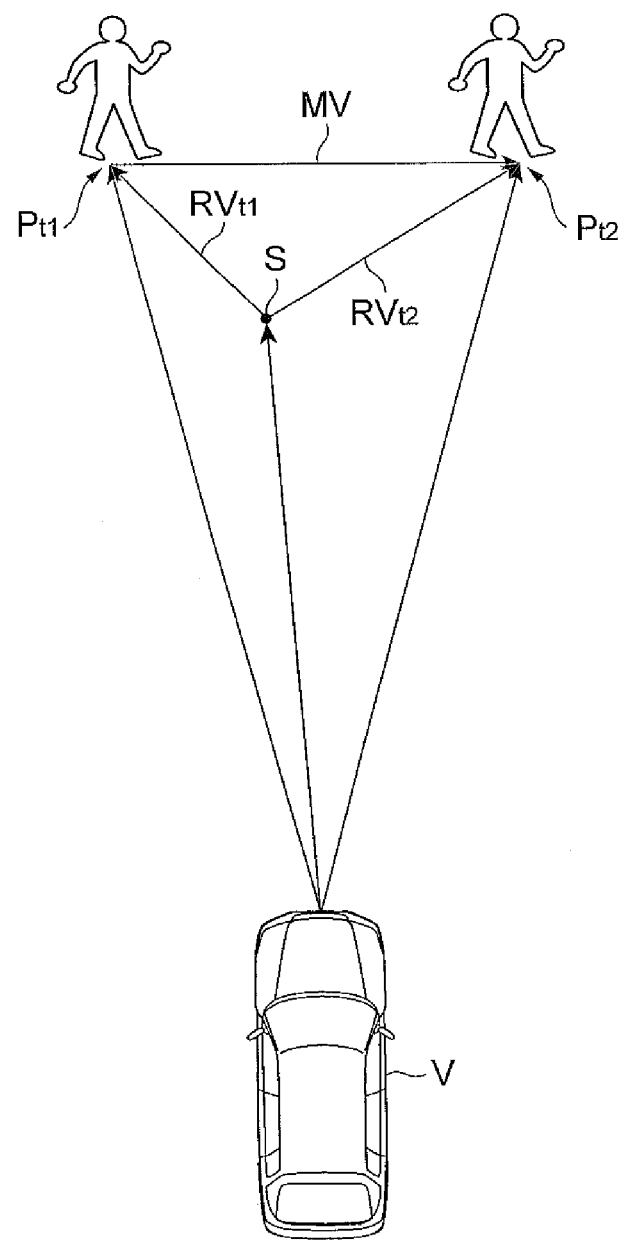
FIG. 2 is an explanatory diagram for explaining a method of calculating a movement amount using a reference point on the road surface.
Figure 3:
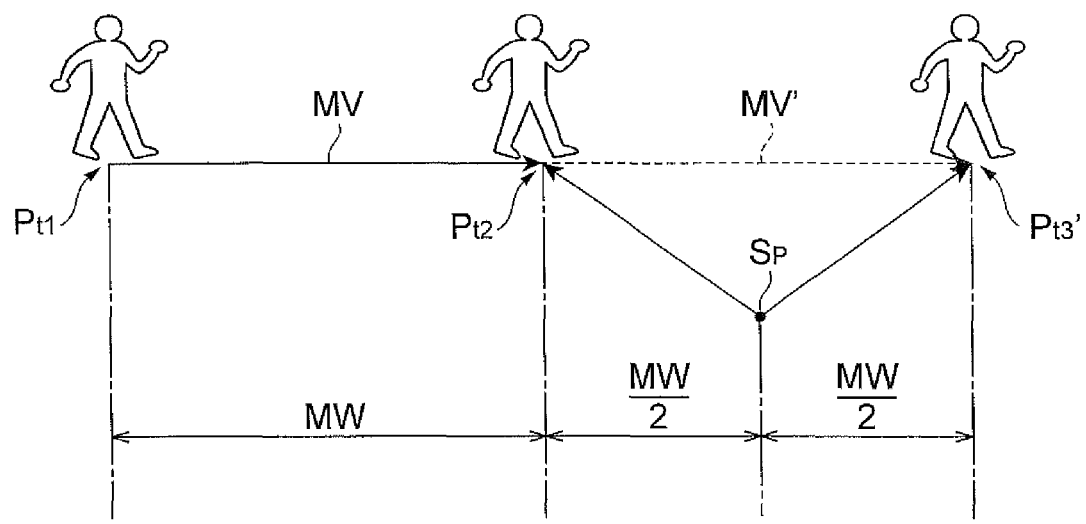
FIG. 3 is an explanatory diagram for explaining a method of setting the reference point using an amount of lateral movement.
Figure 4:
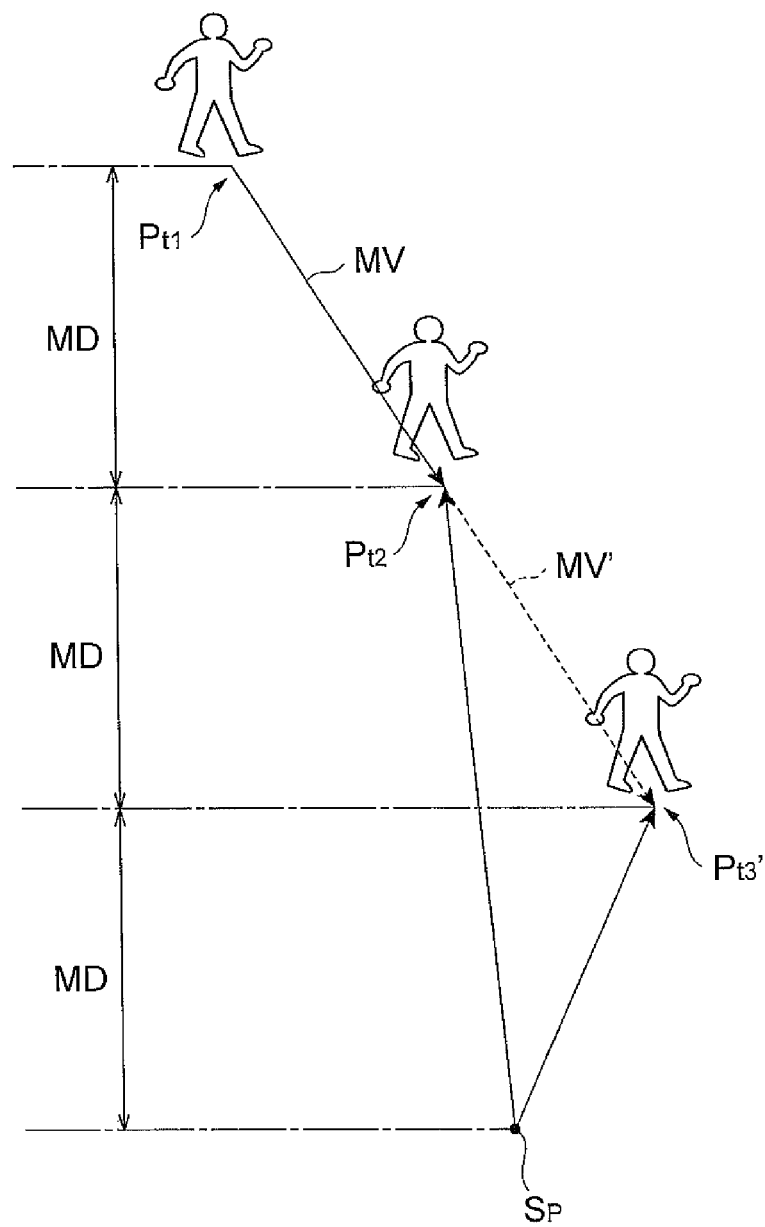
FIG. 4 is an explanatory diagram for explaining a method of setting the reference point using an amount of distance movement.
Figure 5:
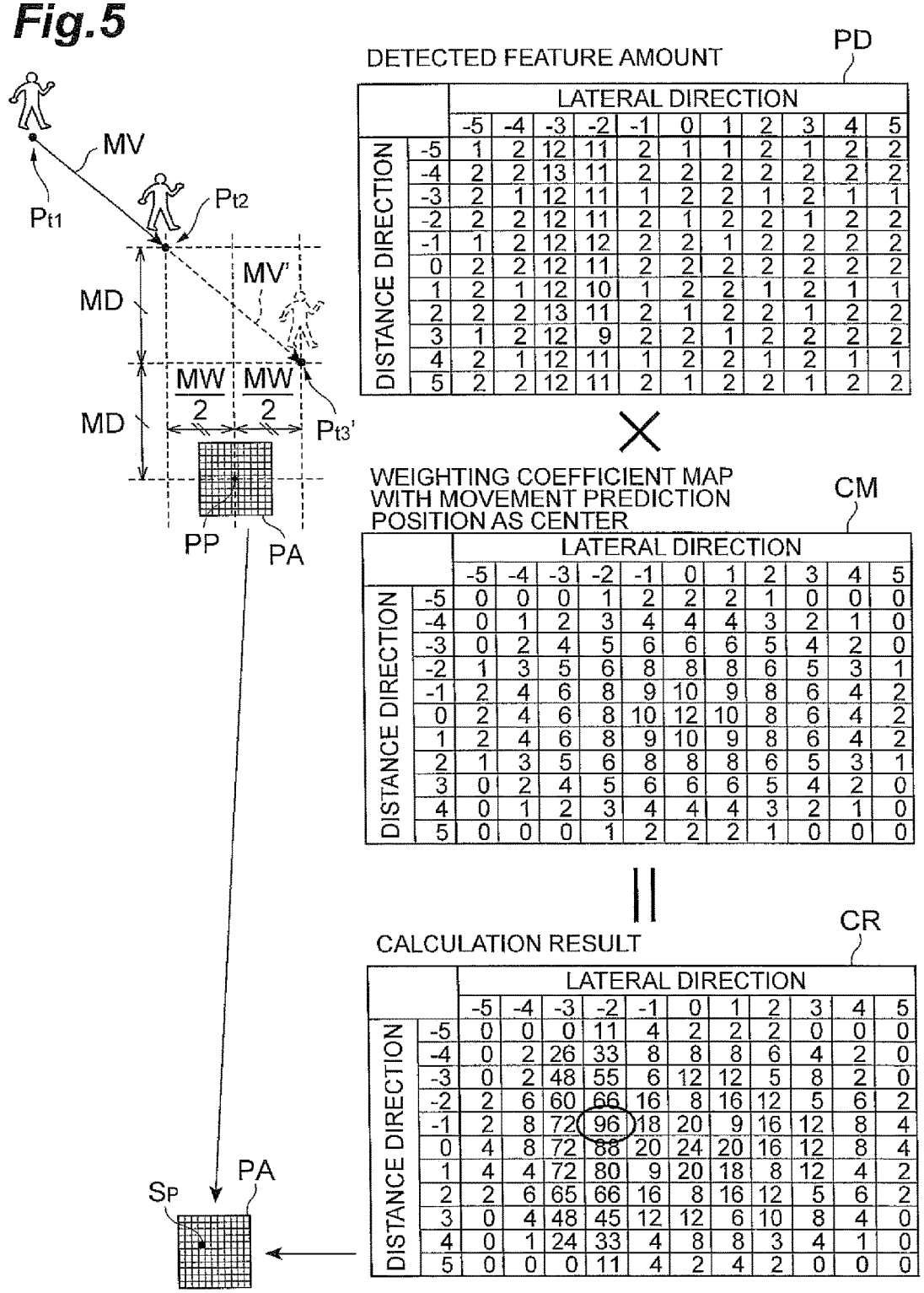
FIG. 5 is an explanatory diagram for explaining reference point setting processing performed in a system ECU in FIG. 1 using a movement amount.
Figure 6:
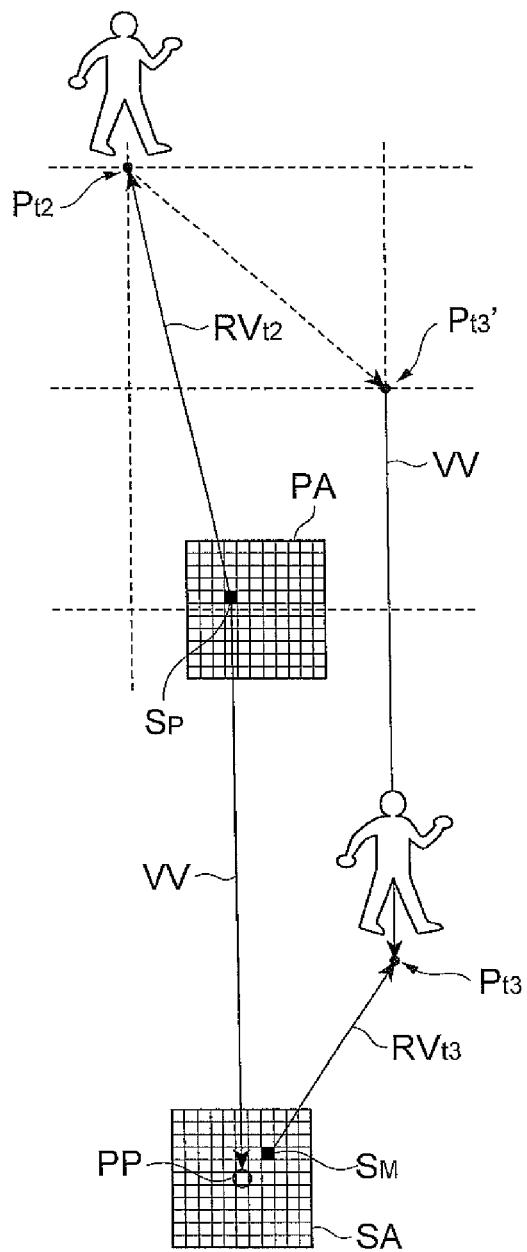
FIG. 6 is an explanatory diagram for explaining reference point movement processing performed in the system ECU in FIG. 1.
Figure 7:
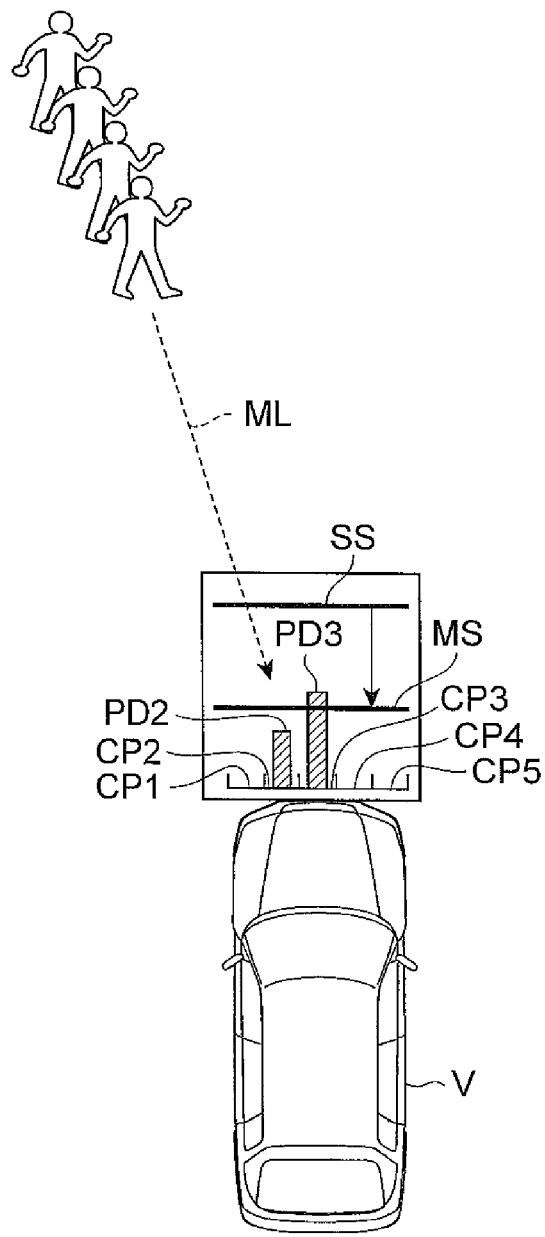
FIG. 7 is an explanatory diagram for explaining collision determination processing performed in the system ECU in FIG. 1.

The collision prediction apparatus 1 in the present embodiment will be described referring to FIG. 1 to FIG. 7. FIG. 1 is a configuration diagram of the collision prediction apparatus in the embodiment of the present invention. FIG. 2 is an explanatory diagram for explaining a method of calculating the vector of movement using a reference point on the road surface. FIG. 3 is an explanatory diagram for explaining a method of setting the reference point using an amount of lateral movement. FIG. 4 is an explanatory diagram for explaining the method of setting the reference point using a movement amount in distance. FIG. 5 is an explanatory diagram for explaining reference point setting processing performed in a system ECU using the movement amount. FIG. 6 is an explanatory diagram for explaining reference point movement processing performed in the system ECU. FIG. 7 is an explanatory diagram for explaining collision determination processing performed in the system ECU.

The collision prediction apparatus 1 sets a feature point of which the feature amount is large on the road surface around the position of the target object as the reference point in order to calculate the movement amount (movement vector) of the target object with high accuracy, and calculates a movement vector using relative vectors (the movement vector is made from the movement amount and a movement direction) of the previous time and this time of the target object from the reference point. Furthermore, in a case of calculating the relative vector of the previous time, the collision prediction apparatus 1 sets the reference point using the movement amount of the target object, and calculates the relative vector from the set reference point and the position of the previous time of the target object. In addition, in a case of calculating the relative vector of this time, the collision prediction apparatus 1 moves the reference point according to movement information of the host vehicle from the reference point of the previous time and calculates the relative vector from the new moved reference point and the position of the target object of this time.

Before describing a configuration of the collision prediction apparatus 1 in detail, a method of calculating the movement vector of the target object will be described referring to FIG. 2. In FIG. 2, a position $P_{t1}$ is assumed to be a position of the target object (a pedestrian) detected at the previous time t1 and a position $P_{t2}$ is assumed to be a position of the target object detected at this time t2 (at the current point in time). A reference point S is set on the road surface from the surroundings of positions $P_{t1}$ and $P_{t2}$ of the target object. The surroundings of positions $P_{t1}$ and $P_{t2}$ where the reference point is set is between the position in a lateral direction (lateral position) of position $P_{t1}$ and the lateral position of position $P_{t2}$, with regard to the lateral direction, and is more to the front side than the position to the front side (the host vehicle V side) from between positions $P_{t1}$ and $P_{t2}$, with regard to a distance direction (depth direction). As the reference point S, a point of which the feature amount is large is selected among the feature points on the road surface extracted from the imaged image of the stereo camera. For example, a point of which a brightness gradient (the feature amount) is large which is obtained by edge processing with respect to each pixel of the image around the target object is selected, and those are a boundary of a white line drawn on the road or a seam of the road. Then, the movement vector MV from the position $P_{t1}$ to the position $P_{t2}$ is obtained by the relative vector $RV_{t1}$ of the previous time t1 at the position $P_{t1}$ seen from the reference point S and the relative vector $RV_{t2}$ of this time t2 at the position $P_{t2}$ seen from the reference point S. The movement vector MV may be obtained not by the relative vector but by the relative position from the reference point S. The magnitude of the movement vector MV is the movement amount in a predetermined time interval of the target object, and a direction of the movement vector MV is the movement direction in the predetermined time interval of the target object. The movement vector MV calculated for each predetermined time interval in a time series is a trajectory of the target object.

As described above, since the feature point on the road surface is set as the reference point, the reference point is a fixed point that is always fixed. Since the relative vector of the target object with respect to the reference point (the point on the road surface) is obtained, the movement information of the host vehicle is not included in the relative vector. Therefore, the movement vector (the movement amount) obtained from the relative vector is not affected by the movement of the host vehicle, and is not affected by the deflection even when the host vehicle is deflected.

In addition, a method of setting the reference point using the amount of lateral movement will be described referring to FIG. 3. In FIG. 3, in order to facilitate easy understanding of the description, a case where a target object is moving right beside the object seen from the host vehicle is illustrated. A position $P_{t1}$ in FIG. 3 is assumed to be a position of the target object detected at the previous time t1 and the position $P_{t2}$ is assumed to be a position of the target object detected at the this time t2. It is assumed that the target object also moves in the next time according to the movement vector MV' same as the movement vector MV between the position of the previous time $P_{t1}$ and the position $P_{t2}$ of this time. The position $P_{t3}'$ is a predicted position of the next time. An amount of difference in a lateral direction (the magnitude of the movement vector MV in a lateral direction) at the position $P_{t1}$ of the previous time and the position $P_{t2}$ of this time becomes an amount of lateral movement MV. The lateral position of a reference point $S_p$ is set from the position around position where MV/2 which is a half (½) of the amount of lateral movement MV is added from the lateral movement direction side of the target object from the position $P_{t2}$. By preferentially setting the reference point as the position around the lateral position by half an amount of lateral movement MV/2 from the position $P_{t2}$ as described above, the lateral position of the reference point reliably enters between the lateral position of the position $P_{t2}$ and the lateral position of the next time.

In addition, a method of setting the reference point using an amount of distance movement will be described referring to FIG. 4. In FIG. 4, in order to facilitate an easy understanding of the description, a case where the target object moves toward the front side (the host vehicle side) is illustrated. A position $P_{t1}$ in FIG. 4 is assumed to be a position of the target object detected at the previous time t1 and a position $P_{t2}$ is assumed to be a position of the target object detected at this time t2. It is assumed that the target object also moves in the next time according to the movement vector MV' same as the movement vector MV between the position $P_{t1}$ of the previous time and the position $P_{t2}$ of this time. The position $P_{t3}'$ is a predicted position at the next time. An amount of difference (the magnitude of the movement vector MV in a distance direction) in a distance direction (a depth direction) of the position $P_{t1}$ of the previous time and the position $P_{t2}$ of this time becomes an amount of distance movement MD. The position of a reference point $S_p$ in a distance direction is set from the position around the position where 2×MD which is the doubled amount of distance movement MD is added to the front side from the position $P_{t2}$. By preferentially setting the reference point as the position around the distance position by the doubled amount of distance movement (2×MD) from the position $P_{t2}$ as described above, the distance position of the reference point ensurely positions in the position $P_{t2}$ and front side of the position of the next time.

The reference point of the next time is set by combining the setting of the reference point using the amount of lateral movement and the setting of the reference point using the amount of distance movement. When the reference point of the next time is set, the relative vector at the position $P_{t2}$ (that becomes the position of the previous time in the next processing) seen from the set reference point may be calculated. The relative vector is used as the relative vector of the position of the previous time in the next processing, and is used for calculating the movement vector.

Since the host vehicle is traveling, even the same feature point on the road surface moves according to the movement of the host vehicle in the coordinate system handled in the processing in the host vehicle during the time of one step. Therefore, as described above, in a case where the reference point in the previous processing is set on the coordinate system handled in the processing in the host vehicle, the feature point on the road surface which becomes the set reference point moves on the coordinate system handled in the processing in the host vehicle in the next processing after the time of one step. However, in a case where the host vehicle is not traveling, the position is the same on the coordinate system handled in the processing in the host vehicle. Therefore, in the next processing, the reference point set in the previous processing is moved on the coordinate system handled in the processing in the host vehicle according to the movement information (the movement amount calculated using the host vehicle speed and the yaw rate) of the host vehicle during the time of one step. At this time, around the position where the reference point is moved, pattern matching is performed using an image feature pattern (for example, a brightness value or the feature amount of each pixel with the feature point as a center) of the feature point on the road surface which is the reference point, a matched image pattern is searched, and then, the matched point is determined as the reference point. When the reference point is determined in this way, the relative vector at the position of the target object seen from the determined reference point is calculated. The movement vector (the movement amount) of the target object in the time of one step is calculated using the relative vector and the relative vector calculated in the previous processing.

Now, a detailed configuration of the collision prediction apparatus 1 will be described. The collision prediction apparatus 1 includes a stereo camera 10, a steering angle sensor 11, a yaw rate sensor 12, a wheel speed sensor 13, a warning device 20, a collision avoidance assist device 21, a seat belt control device 22, a seat control device 23, a brake control device 24, and a system electronic control unit (ECU) 30.

In the present embodiment, the stereo camera 10 is equivalent to an object detection unit in Claims attached hereto, the yaw rate sensor 12 and the wheel speed sensor 13 are equivalent to a movement information acquisition unit in Claims attached hereto, and each processing in the system ECU 30 is equivalent to each of a fixed object detection unit, a feature amount acquisition unit, a reference point setting unit, and a movement information calculation unit and a determination unit in Claims attached hereto.

The stereo camera 10 is formed of a pair of cameras on the right and the left that images the front of the host vehicle and an image processing device. The pair of cameras on the right and left in the stereo camera 10 images an image for each predetermined time interval (for example, for each 1/30 second), and acquires a left image and a right image. Then, the image processing device of the stereo camera 10 performs object detection processing using the left image and the right image (stereo images), in a case where an object (a target object) can be detected, acquires information of the object (for example, a relative distance from the stereo camera 10 (the host vehicle) to the object or the direction (position information), and a shape of the object). In the object detection processing using the stereo image, for example, a correlation calculation is performed between the stereo images by applying a known technology in the related art, the distance to the object is calculated using a parallax obtained from the calculation result, and then, the object is detected. Then, the stereo camera 10 transmits information of the existence of the object or information for each object (each target object) in a case where an object exists, to the system ECU 30 as a stereo camera signal for each constant time.

The object to be detected by the stereo camera 10 is the object having some extent of size or height such as a pedestrian, a bicycle, a vehicle, an electric pole, or a traffic sign. In addition, the image processing in the stereo camera 10 is performed in the coordinate system of a pixel unit in a horizontal and vertical direction of the images imaged by the cameras, and the information of the object is data in pixel units. In addition, an identification number is assigned to the detected target object, and in a case where the same target objects are detected at different times, the same identification number is assigned and the number of detections is counted. The information on this identification number and the number of detections is also transmitted to the stereo camera as the information for each target object.

The steering angle sensor 11 is a sensor that detects a steering angle input to a steering wheel by the driver. In the steering angle sensor 11, the steering angle is detected for each predetermined time interval, and the detected steering angle is transmitted to the system ECU 30 as a steering angle signal.

The yaw rate sensor 12 is a sensor that detects a yaw rate acting on the host vehicle. In the yaw rate sensor 12, the yaw rate is detected for each predetermined time interval, and the detected yaw rate is transmitted to the system ECU 30 as a yaw rate signal.

The wheel speed sensors 13 are sensors that are respectively provided on four wheels of the vehicle and detect rotation speeds of the wheels (the number of pulses according to the rotation of the wheels). In the wheel speed sensor 13, the number of rotation pulses of the wheels is detected constant for each time interval, and the detected number of wheel rotation pulses is transmitted to the system ECU 30 as a wheel speed signal. In the system ECU 30, the wheel speed is respectively calculated from the number of rotation pulses of each wheel, and the speed of the vehicle body (vehicle speed) is calculated from the wheel speed of each wheel.

The warning device 20 is a device that performs a warning to the driver of the host vehicle. As the warning, an output of a buzzer (audible alarm), a voice, and an output display of a warning message are included. In the warning device 20, when a warning control signal is received from the system ECU 30, the warning is output based on the warning control signal.

The collision avoidance assist device 21 is a device for avoiding a collision or alleviating a shock caused by the collision by a steering control (an automatic steering, a steering assist, or the like). In the collision avoidance assist device 21, when a collision avoidance control signal is received from the system ECU 30, the steering control is performed based on the collision avoidance control signal.

The seat belt control device 22 is a device for controlling a clamping force of a seat belt and reducing a damage of the collision. The seat belt control device 22, when a seat belt control signal is received from the system ECU 30, controls the clamping force of the seat belt based on the seat belt control signal.

The seat control device 23 is a device for controlling the position or the posture of the seat and reducing the damage of the collision. In the seat control device 23, when a seat control signal is received from the system ECU 30, the position or posture of the seat is controlled based on the seat control signal.

The brake control device 24 is a device for avoiding the collision or alleviating the shock caused by the collision by a brake control (an automatic stop, an automatic deceleration, a braking assist, or the like). In the brake control device 24, when a brake control signal is received from system ECU 30, the brake control is performed based on the brake control signal.

The system ECU 30 is an electronic control unit that is formed from a central processing unit (CPU), a read only memory (ROM), a random access memory (RAM), and the like and performs overall controls of the collision prediction apparatus 1. In the system ECU 30, the stereo camera signal is received from the stereo camera 10 for each predetermined time interval. In addition, in the system ECU 30, the detection signals are received from each of the sensors 11, 12, and 13. Then, the system ECU 30 performs the following processing tasks using the stereo camera signal and each detection signal: reference point setting processing, previous time relative vector calculation processing, reference point moving processing, current relative vector calculation processing, the movement vector calculation processing, the moving object determination processing, the threshold value setting processing, collision position prediction processing, collision probability integration processing, processing of determining the collision, and device control processing. In a case where there is a probability that the host vehicle collides with an object, the system ECU 30 transmits a control signal to a device necessary for avoiding the collision or reducing the damage of the collision. The reference point setting processing in the system ECU 30 is equivalent to the fixed object detection unit and the feature amount acquisition unit in Claims attached hereto, the reference point setting processing and the reference point moving processing are equivalent to the reference point setting unit in Claims attached hereto, the previous time relative vector calculation processing, this time relative vector calculation processing, and the movement vector calculation processing are equivalent to the movement information calculation unit in Claims attached hereto, and the moving object determination processing is equivalent to the determination unit in Claims attached hereto.

In the system ECU 30, in a case where the one target object is continuously detected three times or more by the stereo camera 10, the movement trajectory of the target object is obtained, and the collision determination between the target object and the host vehicle is performed. In addition, in the system ECU 30, in a case where the target object is detected by the stereo camera 10, the processing is performed for each target object. In addition, in the system ECU 30, the processing is performed on the coordinate system of length unit in the lateral or the distance direction (for example, tens of centimeter unit or a few centimeter unit), and the data in pixel units of the image in the horizontal and vertical direction obtained from the stereo camera 10 is converted into the data of length unit in the lateral or distance direction. The processing may be performed on the coordinate system of pixel unit of the image in the horizontal or vertical direction without performing the conversion described above.

The reference point setting processing will be described referring to FIG. 5. FIG. 5 is a diagram of a case seen from the coordinate system fixed on the ground. In the system ECU 30, the amount of lateral movement MW is calculated by the difference of the lateral positions and the amount of distance movement MD is calculated by the difference of the distance positions using the position $P_{t1}$ of the previous time and the position $P_{t2}$ of this time of the target object. Then, in the system ECU 30, a movement prediction position $P_{r1}$ is calculated, in which a half of the amount of lateral movement MW (MW/2) is added to the lateral movement direction side and the doubled amount of distance movement MD (2×MD) is added in the front direction side from the current position $P_{t2}$.

Then, in the system ECU 30, a candidate area PA is set with the movement prediction position PP as a center. The size of the candidate area PA is set considering the length unit of the coordinate system, the processing capability of the system ECU 30, and the capacity of the memory. Furthermore, in the system ECU 30, using feature amount data of each coordinate point in the candidate area PA and weighting coefficient data of each coordinate point, the feature amount is multiplied by the weighting coefficient data for each corresponding coordinate point, and a multiplied value is obtained. Then, in the system ECU 30, among the multiplied value of each coordinate point in the candidate area PA, the coordinate point having a largest multiplied value is set as the reference point $S_p$ of the next time.

In a case of the example in FIG. 5, the candidate area PA respectively has eleven units of regions in the coordinate system unit in the lateral and distance direction, an index in the lateral and distance direction is zero at the coordinate point of the movement prediction position PP, and the indices are in the range of −5 to 5 with zero as a center. An absolute value of the brightness gradient by edge processing is used as the feature amount of the image, and an example of the feature amount data PD of each coordinate point in the candidate area PA is illustrated. In a case of this feature amount data PD, the feature amount is indicated by integers from zero to 12, and there is a white line (line for the lane) at the position of indices −3 and −2 in the lateral direction, and thus, the feature amount is large. In addition, an example of a weighting coefficient map CM in the candidate area PA is illustrated. In a case of this weighting coefficient map CM, the weighting coefficients are indicated by integers from zero to 12, and the weighting coefficient on the coordinate point of movement prediction position PP where the index in the lateral direction is zero and the index in the distance direction is zero is the largest weighting coefficient value of 12. The weighting coefficient becomes smaller as the point positions are farther from this coordinate point. Then, a calculation result CR by the feature amount data PD and the weighting coefficient map CM is illustrated. As can be seen by the calculation result CR, the multiplied value of the coordinate point where the index in the lateral direction is −2 and the index in the distance direction is −1 is a value of 96 (12×8) which is a maximum value, and this coordinate point becomes the reference point $S_p$ of the next time.

The previous time relative vector calculation processing will be described. When the reference point $S_p$ is set in the reference point setting processing, in the system ECU 30, the relative vector of the position $P_{t2}$ of this time with the reference point $S_p$ as a reference is calculated using the reference point $S_p$ and the position $P_{t2}$ of this time. The relative vector is used as the relative vector of the previous time in the movement vector calculation processing of the next time. Incidentally, in FIG. 6, the relative vector $RV_{t2}$ of the position $P_{t2}$ of the previous time with the reference point $S_p$ set in the previous time as a reference is illustrated.

The reference point moving processing will be described referring to FIG. 6. FIG. 6 is a diagram of a case seen from the coordinate system fixed on the host vehicle. In a case where the reference point $S_p$ before the time of one step is set in the previous time reference point setting processing, and the relative vector $RV_{t2}$ of the position $P_{t2}$ of the previous time is calculated in the previous time relative vector calculation processing of the previous time, in the system ECU 30, the movement information of the host vehicle (for example, the movement vector and the movement amount) for the time of one step is calculated using the host vehicle speed and the yaw rate. Then, in the system ECU 30, the movement prediction position PP in which the reference point $S_p$ set in the previous time reference point setting processing is moved by the movement information of the host vehicle for one step of time is calculated. In FIG. 6, the reference point $S_p$ is moved to the movement prediction position PP by the movement vector VV of the host vehicle. Then, in the system ECU 30, a search area SA is set with the movement prediction position PP as a center. The size of the search area SA is set considering the length unit of the coordinate system, the processing capability of the system ECU 30, and the capacity of the memory. Furthermore, in the system ECU 30, matching processing of the reference point $S_p$ in the search area SA with the image feature pattern (for example, pixel information or the feature amount) is performed, and the coordinate point in which the reference point $S_p$ matches the image feature pattern becomes the reference point $S_M$ of this time. Here, a correlation between the reference point $S_p$ and the image feature pattern is taken for each coordinate point in the search area SA, and the coordinate point of which the correlation is highest becomes the reference point $S_M$.

In FIG. 6, the position $P_{t2}$ of the previous time and the position $P_{t3}$ of this time of the target object detected by the stereo camera 10 are illustrated and a position $P_{t3}'$ of this time of the target object in a case where the target object moves the moved portion is illustrated. On the coordinates, the position $P_{t3}$ of this time is the position where the moved portion of the host vehicle of the time of one step is added to the position $P_{t3}'$ by the moved portion of the target object. Therefore, on the coordinate, in a case where the relative vector of the position $P_{t3}$ of this time of the target object is calculated, it is necessary to use the reference point $S_M$ which is moved as much as the moved portion of the host vehicle for the time of one step without the reference point $S_p$ set at the previous time.

This time relative vector calculation processing will be described referring to FIG. 6. When the reference point is moved to the reference point $S_M$ in the reference point moving processing, in the system ECU 30, the relative vector of the position $P_{t3}$ of this time with the reference point $S_M$ as the reference is calculated using the reference point $S_M$ and the position $P_{t3}$ of this time. In FIG. 6, the relative vector $RV_{t3}$ of the position $P_{t3}$ of this time with the reference point $S_M$ after the movement as the reference is illustrated.

The movement vector calculation processing will be described. When the relative vector $RV_{t3}$ of the position $P_{t3}$ of this time is calculated in this time relative vector calculation processing, in the system ECU 30, the movement vector from the position $P_{t2}$ of the previous time to the position $P_{t3}$ of this time is calculated using the relative vector $RV_{t2}$ of the position $P_{t2}$ of the previous time before the time of one step calculated in the previous time relative vector calculation processing and the relative vector $RV_{t3}$ of the position $P_{t3}$ of this time (refer to FIG. 2). In this way, the movement vector is calculated from the change of the position $P_{t2}$ of the previous time and the position $P_{t3}$ of this time detected at different points in time with the reference point S as the reference. The magnitude of the movement vector is the movement amount in the time of one step, and the direction of the movement vector is the movement direction in the time of one step.

The moving object determination processing will be described. When the movement vector (the movement amount) is calculated in the movement vector calculation processing, in the system ECU 30, it is determined whether or not the movement amount of the target object is equal to or greater than a moving object determination threshold value. The moving object determination threshold value is a threshold value with which it is determined whether the target object is the moving object or not, and is appropriately set in advance by an experiment or a simulation. In the system ECU 30, in a case where the movement amount of the target object is equal to or larger than the moving object determination threshold value, the target object is determined to be a moving object, and in a case where the movement amount of the target object is less than the moving object determination threshold value, the target object is determined to be a static object.

The threshold value setting processing will be described referring to FIG. 7. The threshold value set in this processing is a collision determination threshold value, and there are a collision determination threshold value SS for an ordinary object (particularly, for the static object) and a collision determination threshold value MS for the moving object. Each of these collision determination threshold values is a threshold value for determining whether or not there is a possibility of the host vehicle colliding with the object by the integration value of the collision probability for each collision prediction position, and is appropriately set in advance by the experiment or the simulation. In a case of a moving object such as a pedestrian, a value more loosened (a value which easily determines that there is a possibility of collision) than the ordinary collision determination threshold value SS is set as the collision determination threshold value MS for the moving object in order to avoid the collision as much as possible for safety (in order to easily operate the assist). On the other hand, in a case of a static object such as an electric pole or the like, a value which does not easily determine that there is a possibility of collision is set as the ordinary collision determination threshold value SS so as not to give a discomfort to the driver by an unnecessary assist (the vehicle control or the warning). In the system ECU 30, the collision determination threshold value SS is set as a default value of the threshold value. In addition, in the system ECU 30, in a case where the target object is determined to be a moving object in the moving object determination processing, the collision determination threshold value MS for the moving object is set, and in a case where the target object is determined to be a static object in the moving object determination processing, the ordinary collision determination threshold value SS is set.

The collision position prediction processing will be described referring to FIG. 7. Each surface (front surface, rear surface, right side surface, and left side surface) of the vehicle is divided into a plurality of sections at predetermined intervals. This section dividing is appropriately set in advance. In an example in FIG. 7, the section dividing of only a front side of the host vehicle V is illustrated. The front side is divided into the 5 sections: CP1, CP2, CP3, CP4, and CP5. In a case of predicting the collision position, which section of each side of the vehicle will collide with the object is predicted. In the system ECU 30, the movement trajectory of the target object is estimated from the time series data of the movement vector of the target object calculated in the movement vector calculation processing, and the movement trajectory of the host vehicle is estimated from the time series data of the host vehicle speed, the yaw rate, and the steering angle of the host vehicle. Then, in the system ECU 30, by the movement trajectory of the target object and the movement trajectory of the host vehicle, in a case where the movement trajectory of the target object and the movement trajectory of the host vehicle intersect each other, the position (which side and which section of the vehicle) where the target object collides with the vehicle is predicted. In a case of the example in FIG. 7, the movement trajectory ML of the target object that approaches the host vehicle V with respect to the host vehicle V traveling straight is illustrated, and from the movement trajectory ML or the like, it is predicted that the collision position is the section CP3 at the center of the front side or the section CP2 at the left side adjacent thereto.

The collision probability integration processing will be described. When the collision position is predicted in the collision position prediction processing, in the system ECU 30, the collision probability at each section around the collision prediction position is calculated. For example, the collision probability may be calculated in the normal distribution shape with the collision prediction position as a center, or the collision probability may be calculated highly only on the collision prediction position. Furthermore, in the system ECU 30, the collision probability is integrated by adding the calculated collision probability to the integration value of the previous time for each section of the collision prediction position. In the case of the example in FIG. 7, the integration value PD3 of the collision probability at the center section CP3 of the front side of the host vehicle V is the largest, and the integration value PD2 of the collision probability at the section CP2 at the left side adjacent thereto is the next largest.

The collision determination processing will be described. In the system ECU 30, with regard to the section of each collision position at each surface of the host vehicle (may be only the section where the integration value is updated in the collision probability integration processing), it is determined whether or not the integration value of the collision probability is equal to or larger than the collision determination threshold value. Then, in the system ECU 30, in a case where the integration value of the collision probability is equal to or larger than the collision determination threshold value, it is determined that there is a possibility of collision (the possibility is high), and in a case where the integration value of the collision probability is smaller than the set collision determination threshold value, it is determined that there is no possibility of collision (the possibility is low). In the case of the example in FIG. 7, if the target object is determined to be a moving object and the collision determination threshold value MS for the moving object is set, the integration value PD3 of the collision probability at the section CP3 is equal to or larger than the collision determination threshold value MS. Therefore, it is determined that there is a possibility of the collision.

The device control processing will be described. In a case where it is determined in the collision determination processing that there is a possibility of collision, in the system ECU 30, a time to collision [TTC=(relative distance/relative speed)] is calculated. Then, in the system ECU 30, it is determined which of the devices (one or more) among the warning, the steering control, seat belt control, seat control, and the brake control is activated based on the TTC with respect to the target object, the collision prediction position, and the integration value of the collision probability. Then, in the system ECU 30, for each activated device, an amount of control or an output instruction is set based on the TTC, the collision prediction position, and the integration value of the collision probability, and then, the control signal is transmitted to each of the corresponding devices among the warning device 20, the collision avoidance assist device 21, the seat belt control device 22, the seat control device 23, and the brake control device 24.

Figure 8:
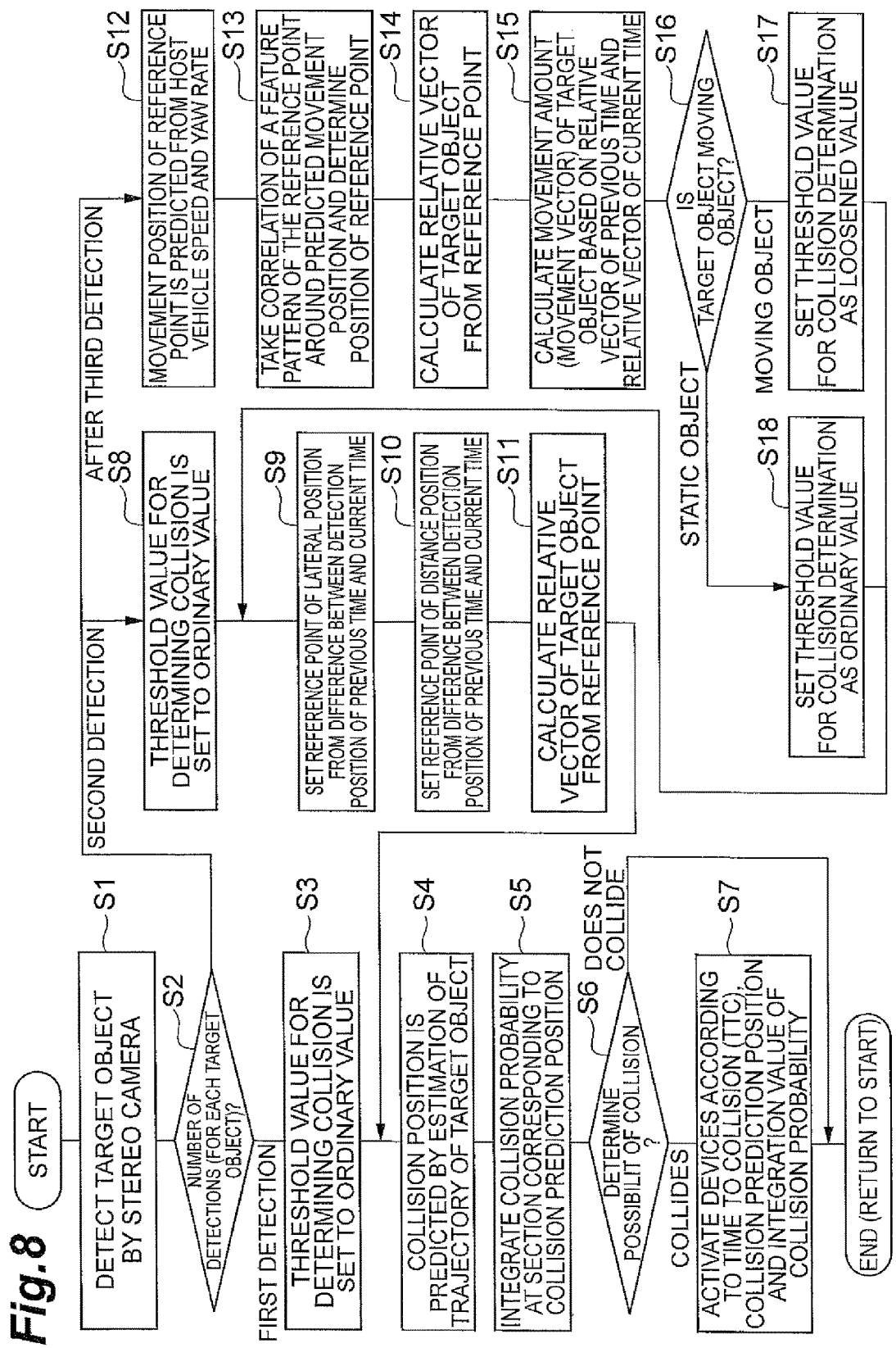
FIG. 8 is a flow chart illustrating a flow of an operation in the collision prediction apparatus in the embodiment of the present invention.

The operation of the collision prediction apparatus 1 will be described along with a flow chart in FIG. 8 referring to FIG. 1 to FIG. 7. FIG. 8 is a flow chart illustrating a flow of the operation in the collision prediction apparatus in the present embodiment. In the collision prediction apparatus 1, the below-described operation is repeatedly performed for each predetermined time interval.

In the stereo camera 10, images are imaged by each of right and left cameras, and the object detection processing is performed using each of the right and left images (the stereo images), and then, in a case where the target object can be detected, the position information of the target object is acquired (S1). Then, in the stereo camera 10, a stereo camera signal made from the existence information of the target object or the position information for each target object in a case where the target object exists is transmitted to the system ECU 30. In the system ECU 30, the stereo camera signal is received, and in a case where the target object exists, the position information is acquired for each target object and is stored. In a case where the target object does not exist, the processing of this time ends.

In the steering angle sensor 11, the steering angle is detected and the steering angle signal is transmitted to the system ECU 30. In the system ECU 30, the steering angle signal is received, and the steering angle is acquired. In the yaw rate sensor 12, the yaw rate is detected and the yaw rate signal is transmitted to the system ECU 30. In the system ECU 30, the yaw rate signal is received and the yaw rate is acquired. In the wheel speed sensor 13 of each wheel, the number of rotation pulses of the wheels is detected and the wheel speed signal is transmitted to the system ECU 30. In the system ECU 30, the wheel speed signal is received for each wheel, and the wheel speed is calculated from the number of rotation pulses of each wheel, and the vehicle body speed (the host vehicle speed) is calculated from each wheel speed.

In a case where the target object exists, the system ECU 30, the number of detections is determined for each target object (S2). In the system ECU 30, in a case where detection of this time is determined to be the first detection, the threshold value for determining the collision is set to the ordinary collision determination threshold value (S3).

In the flow chart in FIG. 8, there are processing tasks of S4 to S7 after S3. However, in a case of the first detection, the processing tasks of S4 to S7 are not performed, and the processing ends. Since the movement trajectory or the like cannot be obtained by only one detection information item of the target object, the collision determination cannot be performed.

In the system ECU 30, in a case where the number of detection of the target object is determined to be the second detection, the threshold value for determining the collision is set to the ordinary collision determination threshold value (S8). Then, in the system ECU 30, the amount of lateral movement is calculated from the difference in the lateral direction between the detection position of the target object of the previous time (first detection) and the detection position of the target object of this time (second detection), and the lateral position of the reference point is set from the position around the position where a half of the amount of lateral movement from the detection position of this time is added to the lateral movement direction side (S9). In addition, in the system ECU 30, the amount of distance movement is calculated from the difference in a distance direction between the detection position of the previous time and the detection position of this time, and the distance position of the reference point is set from the position around the position where the doubled amount of distance movement from the detection position of this time is added to the front side (S10). By the processing tasks in S9 and S10, the reference point (in which only the moved portion of the target object is considered) of the next time is set. Then, in the system ECU 30, the relative vector (may be the relative position) from the reference point to the position of the target object of this time is calculated using the set reference point and the detection position of this time (S11). The relative vector is used for the processing of next time.

In the flow chart in FIG. 8, there are processing tasks of S4 to S7 after S11. However, in a case of the second detection, the processing tasks of S4 to S7 are not performed, and the processing ends. Since the movement vector (which corresponds to the movement trajectory) is calculated after the third detection, the collision determination or the like cannot be performed in the second detection.

In the system ECU 30, in a case where the detection of this time is determined to be the third detection or thereafter, the reference point (the reference point by only the moved portion of the target object) set in the processing tasks in S9 and S10 of the previous time using the host vehicle speed and the yaw rate is moved, and then, the movement position is predicted (S12). In the system ECU 30, the search area is set around the predicted movement position, a correlation of a feature pattern of the reference point set in the processing tasks in S9 and S10 of the previous time in the search area is taken, and the position of the reference point (the reference point where the movement portion of the host vehicle is added) is determined (S13). Then, in the system ECU 30, the relative vector (may be the relative position) from the reference point to the position of the target object of this time is calculated using the determined reference point and the detection position of this time (S14).

Furthermore, in the system ECU 30, the movement vector (the movement amount and the movement direction) of the target object is calculated from the relative vector of the previous time calculated in S11 and the relative vector calculated at this time (S15). Then, in the system ECU 30, it is determined whether or not the target object is the moving object by determining whether or not the movement amount is equal to or larger than the moving object determination threshold value (S16). In a case where it is determined that the movement amount is equal to or larger than the moving object determination threshold value in S16, in the system ECU 30, the target object is determined to be the moving object, and the threshold value (the more loosened threshold value) for the moving object is set as the threshold value for the collision determination (S17). On the other hand, in a case where it is determined that the movement amount is smaller than the moving object determination threshold value in S16, in the system ECU 30, the target object is determined to be the static object, and the ordinary threshold value is set as the threshold value for the collision determination (S18).

Then, the process proceeds to S9, and in the system ECU 30, the processing tasks S9 to S11 described above are performed to set the reference point of the next time and to calculate the relative vector from the reference point to the position of the target object of this time.

Then, the process proceeds to S4, and in the system ECU 30, the movement trajectory of the target object is estimated by the time series movement vector calculated with respect to the target object and the movement trajectory of the host vehicle is estimated from the time series data of the host vehicle speed, the yaw rate, and the steering angle of the host vehicle, and then, from the movement trajectory of the target object and the movement trajectory of the host vehicle, the position where the target object collides with host vehicle is predicted (S4). Furthermore, in the system ECU 30, the collision probability at the section corresponding to the collision prediction position is integrated (S5). In a case where the movement trajectory of the target object and the movement trajectory of the host vehicle do not intersect, the collision position is not predicted and the processing in S5 is not performed.

Then, in the system ECU 30, it is determined whether or not there is a possibility of the collision between the host vehicle and the target object by determining whether or not the integration value of the collision probability at each collision prediction position is equal to or larger than the collision determination threshold value (S6). In a case where it is determined in S6 that there is no possibility of collision, in the system ECU 30, the processing of this time ends. On the other hand, in a case where it is determined in S6 that there is a possibility of collision, in the system ECU 30, it is determined which of the devices among the warning, the steering control, the seat belt control, the seat control, and the brake control is activated based on the time to collision (TTC), the collision prediction position, and the integration value of the collision probability. The control amount of the device determined to be activated is set, and then, the control signal is transmitted to each of the corresponding devices among the warning device 20, the collision avoidance assist device 21, the seat belt control device 22, the seat control device 23, and the brake control device 24 (S7). In the warning device 20, in a case where the warning control signal is received from the system ECU 30, the warning is output based on the warning control signal. In the collision avoidance assist device 21, in a case where the collision avoidance control signal is received from the system ECU 30, the steering control is performed based on the collision avoidance control signal. In the seat belt control device 22, in a case where the seat belt control signal is received from the system ECU 30, the clamping force of the seat belt is controlled based on the seat belt control signal. In the seat control device 23, in a case where the seat control signal is received from the system ECU 30, the position or the posture of the seat is controlled based on the seat control signal. In the brake control device 24, in a case where the brake control signal is received from the system ECU 30, the brake control is performed based on the brake control signal.

According to the collision prediction apparatus 1, the feature point (a point which never moves) on the road surface is set to the reference point and the movement information (the movement vector (the movement amount or the movement direction)) of the target object is calculated, and then, it is possible to obtain the movement amount of the target object with high accuracy. In this way, even in a case where the host vehicle deflects so minutely that the deflection cannot be detected by the sensor (particularly, in a case where the target object exists far away), it is possible to obtain the movement amount of the target object with high accuracy without being affected by the deflection. Furthermore, it is possible to determine whether the target object is a moving object or a static object with high accuracy using the highly accurate movement amount. According to the determination, it is possible to set, as the threshold value for the collision determination, the threshold value suitable for the static object or the threshold value suitable for the moving object. Thus, it is possible to perform the collision determination with high accuracy according to the determination of whether target object is the static object or the moving object. As a result, in a case of the static object, the unnecessary assist can be suppressed (a discomfort caused by the unnecessary assist is not given to the driver), and in a case of the moving object, it is possible to perform the assist focusing on the safety.

In addition, according to the collision prediction apparatus 1, by setting the reference point of the next time based on the movement amount (the amount of lateral movement or the amount of distance movement) of the target object from the previous time, the processing area for setting the reference point can be squeezed, and thus, it is possible to reduce the processing load or the amount of memory. Particularly, by setting the reference point at the front side using the amount of distance movement, even in a case where the target object moves to the host vehicle side, the reference point is not hidden behind the target object.

In addition, according to the collision prediction apparatus 1, by setting the reference point by performing a pattern matching around the position which is moved as much as the host vehicle's moved portion from the reference point set in the previous time, the processing area for setting the reference point can be squeezed, and thus, it is possible to reduce the processing load or the amount of memory, and to decrease the erroneous matching.

Figure 9A:
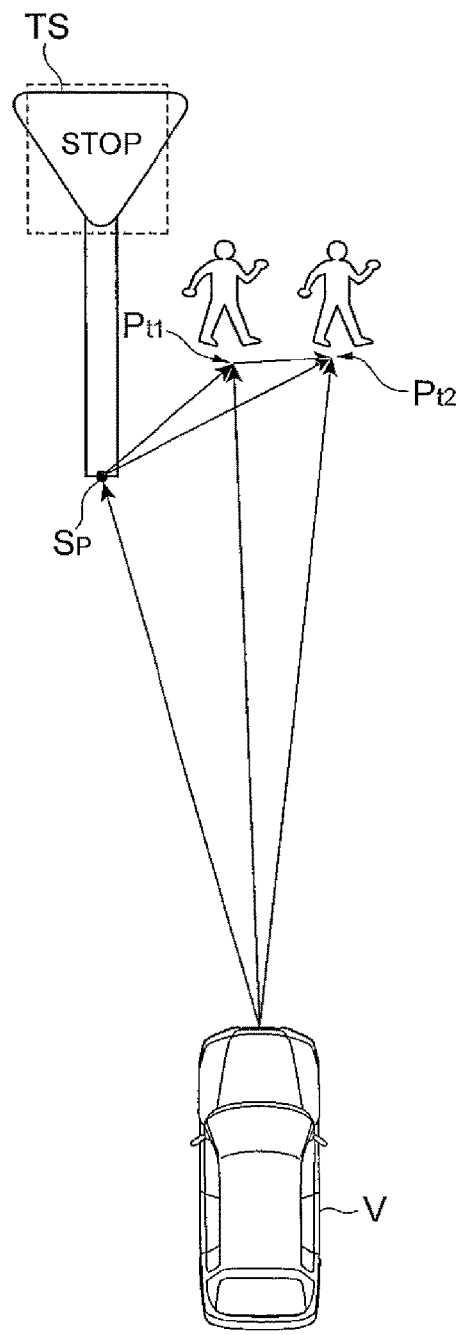
FIG. 9A and FIG. 9B is a diagram for explaining another method of setting the reference point.
Figure 9B:
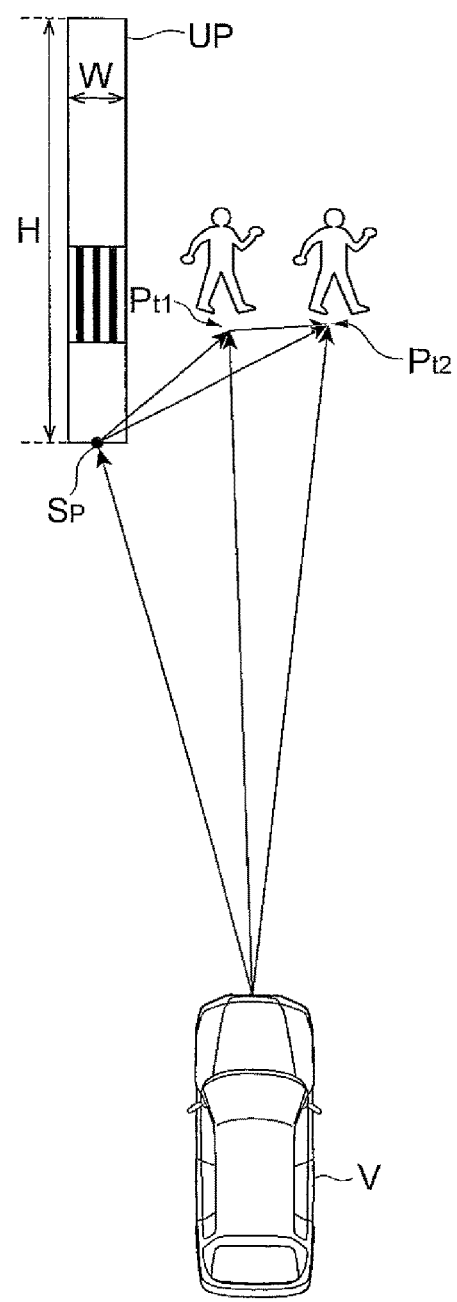

In the embodiment described above, as the reference point, a point having a large feature amount on the road surface around the target object is set as the reference point. However, the reference point may be set by another method, and a fixed object installed on the road or the roadside can be set as the reference point. Setting of the reference point by another method will be described referring to FIG. 9A and FIG. 9B. FIG. 9A and FIG. 9B is a diagram for explaining another method of setting the reference point, FIG. 9A illustrates a case where the traffic sign is set as the reference point, and FIG. 9B illustrates a case where the electric pole is set as the reference point.

With respect to the collision prediction apparatus 1 described above, since only the reference point setting processing in the system ECU 30 is different, only the reference point setting processing in the system ECU 30 will be described. There are two methods in setting the fixed object installed on the road or the roadside as the reference point: a method of recognizing the fixed object by the pattern matching and a method of identifying (shape identification) the fixed object by dimension information.

The method of recognizing the fixed object by pattern matching will be described. A template (pattern information) relating to various traffic signs installed on the road or the roadside is held in the system ECU 30 for the pattern matching. The pattern information of a number, a symbol, a character, a picture written in the traffic sign, and pattern information of an external shape of the traffic sign are examples of the pattern information (feature amount) included in the traffic sign. Those pattern information items are set as the template. The pattern in the pattern information of the traffic sign is the pattern that the pedestrian or the vehicle does not have, and can be easily recognized by the pattern matching. Besides the traffic sign, a traffic signal (a traffic signal for the pedestrian other than a general traffic signal for the vehicle) may be included in the fixed object or a template relating to the traffic signal may be held. In a case of an example of a traffic sign TS indicating "STOP", there is a template of characters "STOP" illustrated in FIG. 9A or a template of an external shape of an inverted triangular shape. Only one template may be held for one traffic sign or a plurality of templates may be held for one traffic sign.

In the system ECU 30, the search area is set using the position $P_{t1}$ of the previous time of the target object and the position $P_{t2}$ of this time (may use only the position $P_{t2}$ of this time). The search area is an area around the position of the target object, and is an area including not only the road but also the roadside. The size of this search area is set considering the length unit of the coordinate system, the processing capability of the system ECU 30 or the capacity of the memory. In the system ECU 30, the range of which the size is same as the size of the template is sequentially cut out from the search area for each held template of the fixed object, and the pattern matching using the template is sequentially performed with respect to the image information (brightness value or the like) of the cut out range. Then, in the system ECU 30, in a case where the pattern that is matched the template is searched, the fixed object (the traffic sign or the like) on the road or the roadside that has the above pattern is recognized, the coordinate point (the coordinate point of the installed position) of the fixed object is specified, and then, the coordinate point of the fixed object is set as the reference point $S_p$ of the fixed object. In a case where there is a plurality of templates for one traffic sign or the like, the pattern matching for each of the plurality of templates is respectively performed, and the fixed object such as the traffic sign or the like is recognized from the result of the plural pattern matching. In this way, by setting the position of the fixed object installed on the road or the roadside as the reference point based on the pattern information of the fixed object such as the traffic sign or the like installed on the road or the roadside, it is possible to set a fixed point which is always fixed on the road or the roadside as the reference point. In addition, by using the pattern matching, it is possible to simply recognize the fixed object installed on the road or the roadside such as the traffic sign or the like with high accuracy.

The method of identifying (shape identification) the fixed object using the dimension information will be described. In the system ECU 30, a threshold value range of the dimension information of various fixed objects installed on the road or the roadside is held for the identifying by the dimension information. The fixed object installed on the road or the roadside is a fixed object having the dimension information which is apparently different from that of the moving object such as the pedestrian or the vehicle, and for example, the electric pole or a post is exemplified as the fixed object. The width, height, or the like is the dimension information (the feature amount) of the fixed object, and the dimension information threshold value range is set. In a case of the electric pole UP illustrated in FIG. 9B, the upper limit threshold value of width is 90 cm and the lower limit threshold value of height is 4.0 m. In a case of this method, in the stereo camera 10, the dimension information of width and height is calculated in advance for each object to be detected (for each target object).

In the system ECU 30, similar to the above description, the search area is set. Then, in the system ECU 30, with regard to the target object detected by the stereo camera 10, it is respectively determined whether or not each dimension of the target object is within the dimension threshold value range for each held threshold value range of the dimension of each fixed object. Here, since a plurality of dimension threshold value ranges is set for one fixed object, the determination is performed using the plurality of dimension threshold value ranges, and it is determined whether or not the dimension of the target object is within all of the dimension threshold value ranges. For example, in a case of the electric pole, since there are the upper limit threshold value of width (for example, 90 cm) and the lower limit threshold value of height (for example, 4.0 m), it is determined whether or not the width W of the target object is within the upper limit threshold value of width and the height H of the target object is within the lower limit threshold value of height. Then, in the system ECU 30, in a case where the target object of which the dimension is within all of the dimension threshold value ranges can be searched, the fixed object (the electric pole or the like) is recognized, the coordinate point (coordinate point of the installed position) of the fixed object is specified, and the coordinate point of the fixed object is set as the reference point $S_p$. In this way, by setting the position of the fixed object installed on the road or the roadside as the reference point based on the dimension information of the fixed object installed on the road or the roadside such as the electric pole, it is possible to set the fixed point which is always fixed on the road or the roadside as the reference point. In addition, by using the determination by the dimension information which is apparently different from that of the moving object, it is possible to simply recognize the fixed object installed on the road or the roadside such as the traffic sign or the like with high accuracy.

When the installation position of the fixed object that is installed on the road or the road surface is set as the reference point $S_p$ in the reference point setting processing, in the system ECU 30, the position of the reference point $S_p$ (the fixed object) is stored on the map of the navigation system (not illustrated) together with the feature amount (pattern information and the dimension information). Then, at the time of traveling in the next time, in the system ECU 30, the position of the fixed object (coordinate point) stored on the map of the navigation system is set as the reference point $S_p$. Alternatively, at the time of traveling in the next time, in the system ECU 30, the search area is set with the position of the fixed object (coordinate point) stored on the map of the navigation system as a center, and each processing similar to that described above is performed using the search area. The search area may be a very narrow range compared to the search area of the case where the fixed object installed on the road or road surface is not searched yet. In this way, by storing the reference point $S_p$ which is the installation position where the fixed object is installed on the road or road surface, on the map, the processing load or the amount of memory can be reduced, and it is possible to determine the fixed object (eventually, the reference point) installed on the road or road surface at an earlier time.

In the present embodiment, as described above, three methods of processing are described as the reference point setting processing. In the system ECU 30, the reference point setting processing may be performed by one method among the three methods, or the reference point setting processing may be performed by combining two or three methods among the three methods.

The embodiment of the present invention is described as above. However, the present invention may be embodied in various forms without being limited to the embodiment described above.

For example, in the present embodiment, the present invention is applied to the apparatus in which the target object is detected, the possibility of collision is determined, and then, in a case where there is a possibility of collision, the assist for the collision avoidance or reducing the damage of the collision is performed. However, the present invention may be applied to another apparatus in which the target object is detected, and another assist is performed using the movement information of the target object or may be applied to an object detection apparatus in which only a detection of a target object (particularly, the movement information) is performed.

In addition, in the present embodiment, the object detection apparatus is configured to be mounted on the vehicle, but may be mounted on other than the vehicle, for example, may be mounted on a moving object other than a vehicle, on a structure, or on a road.

In addition, in the present embodiment, the stereo camera is applied as the external sensor that detects the object. However, the external sensors such as a monocular image sensor (a sensor in which the distance, a lateral position, dimension information can be detected by monocular imaging), or a laser radar (a high resolution radar in which a feature point on the road can be identified) may be applied. In addition, in the stereo camera as the external sensor, a millimeter-wave radar, a laser radar, or the like may be combined as the operation condition of the device.

In addition, in the present embodiment, as the device for operation in a case where there is a possibility of collision, each of the devices of warning, steering, the seat belt control, the seat control, and the brake control is are shown. However, at least one device among those devices may be enough, or another device (actuator) may also be preferable.

In addition, in the present embodiment, at the time of setting the reference point using the movement amount of the previous time, a half of the amount of lateral movement is moved to the lateral direction and a doubled amount of distance movement is moved to the to the front direction. However, those numeric values are experimental values. Thus, in a case of lateral direction, the value may be another value such as ⅓ (factors between 0 and 1 time), and in a case of distance direction, the value may be another value such as 1.5 time (factors between 1 and 2 times).

In addition, in the present embodiment, in a case where the number of detections for one object (the target object) is three or more, the movement vector (the movement amount) is calculated, and the moving object determination or the collision determination is performed. However, the moving object determination or the collision determination may be performed in a case where the number of detections for one object is two.

In addition, in the present embodiment, an example of the prediction of the collision position using the trajectory of the target object and the trajectory of the host vehicle, and the collision determination using the integration of the collision probability of each collision prediction position are shown. However, with regard to these processing tasks, the technology in the related art may be applied.

In addition, in the present embodiment, the movement vector or the movement amount is obtained as the movement information of the target object, and it is determined whether or not the target object is the moving object based on the movement amount. However, the movement information may be the information such as the movement speed, or it may be determined whether or not the target object is the moving object based on the information.

INDUSTRIAL APPLICABILITY

The present invention can be used for an object detection unit that detects a target object from a host vehicle and a driving assistance apparatus that performs a collision avoidance assist between the host vehicle and the target object based on the detection result.

REFERENCE SIGNS LIST

1 collision prediction device
10 stereo camera
11 steering angle sensor
12 yaw rate sensor
13 wheel speed sensor 20 warning device
21 collision avoidance assist device
22 seat belt control device
23 seat control device
24 brake control device
30 system ECU

The invention claimed is:

1. An object detection apparatus that detects a target object from a predetermined mounting position, comprising:
a stereo camera configured to perform an object detection from the predetermined mounting position, and in a case where a target object is detected, acquires a first position of the target object at a first time and a second position of the target object at a second time;
an electronic control unit configured to:
estimate a third position of the target object at a third time based on a movement vector from the first position to the second position;
acquire a feature amount on a road surface between the second and third positions of the target object;
set a reference point on the road surface based on the feature amount on the road surface acquired by the electronic control unit; and
calculate movement information of the target object from the second position of the target object acquired by the stereo camera with the reference point set by the electronic control unit as a reference, in a case where the target object is detected by the stereo camera,
wherein the electronic control unit sets the reference point from the position surrounding a lateral direction from adding 0 to 1 times a movement amount in the lateral direction of the target object detected by the stereo camera to the lateral movement direction side, from the position in the lateral direction of the target object acquired by the stereo camera.

2. An object detection apparatus that detects a target object from a predetermined mounting position, comprising:
a stereo camera configured to perform an object detection from the predetermined mounting position, and in a case where a target object is detected, acquires a first position of the target object at a first time and a second position of the target object at a second time;
an electronic control unit configured to:
estimate a third position of the target object at a third time based on a movement vector from the first position to the second position;
acquire a feature amount on a mad surface between the second and third positions of the target object;
set a reference point on the road surface based on the feature amount on the road surface acquired by the electronic control unit; and
calculate movement information of the target object from the second position of the target object acquired by the stereo camera with the reference point set by the electronic control unit as a reference, in a case where the target object is detected by the stereo camera,
wherein the electronic control unit sets the reference point from the position surrounding a distance direction from adding 1 to 2 times a movement amount a movement amount in the distance direction of the target object detected by the stereo camera to the predetermined mounting position in the distance direction side, from the position in the distance direction of the target object acquired by the stereo camera.

3. The object detection apparatus according to claim 1, further comprising:
a yaw rate sensor and a wheel speed sensor configured to acquire movement information of the predetermined mounting position,
wherein the electronic control unit sets a new reference point around the position to which the set reference point is moved based on the movement information acquired by the yaw rate sensor and the wheel speed sensor.

* * * * *